US012784636B2

(12) United States Patent
An et al.

(10) Patent No.: US 12,784,636 B2

(45) Date of Patent: Nov. 3, 2026

(54) DISPLAY DEVICE, CONTROLLER, AND METHOD OF DRIVING DISPLAY DEVICE

(71) Applicant: SAMSUNG DISPLAY CO., LTD., Yongin-si (KR)

(72) Inventors: Jungeon An, Yongin-si (KR); Kihyun Pyun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/976,730

(22) Filed: Dec. 11, 2024

(65) Prior Publication Data

US 2025/0273120 A1 Aug. 28, 2025

(30) Foreign Application Priority Data

Feb. 28, 2024 (KR) ........................ 10-2024-0028535

(51) Int. Cl.
*G09G 3/20* (2006.01)
*G09G 3/3233* (2016.01)

(52) U.S. Cl.
CPC ......... *G09G 3/2092* (2013.01); *G09G 3/3233* (2013.01); *G09G 2300/0842* (2013.01); *G09G 2320/064* (2013.01); *G09G 2330/00* (2013.01); *G09G 2330/021* (2013.01); *G09G 2330/025* (2013.01); *G09G 2330/04* (2013.01)

(58) Field of Classification Search
CPC ............... G09G 3/2092; G09G 3/3233; G09G 2300/0842; G09G 2320/064; G09G 2330/00; G09G 2330/021; G09G 2330/025; G09G 2330/04
See application file for complete search history.

(56) References Cited

U.S. PATENT DOCUMENTS

| | | | | |
|---|---|---|---|---|
| 8,063,866 | B2 * | 11/2011 | Hayashi | G09G 3/20 345/98 |
| 8,259,059 | B2 * | 9/2012 | Park | G09G 3/3611 345/102 |
| 8,648,793 | B2 * | 2/2014 | Mihara | G09G 3/34 345/589 |
| 9,443,478 | B2 * | 9/2016 | Min | G09G 3/3413 |
| 10,204,563 | B2 * | 2/2019 | Takahashi | G09G 3/3275 |
| 10,891,893 | B2 * | 1/2021 | Nadershahi | G09G 3/32 |
| 11,222,597 | B2 * | 1/2022 | Bong | G09G 3/2092 |
| 12,633,264 | B2 * | 5/2026 | Kwon | G09G 3/3291 |

(Continued)

FOREIGN PATENT DOCUMENTS

| | | |
|---|---|---|
| KR | 10-2017-0077780 A | 7/2017 |
| KR | 10-2021-0086793 A | 7/2021 |

*Primary Examiner* — Michael J Jansen, II

(74) *Attorney, Agent, or Firm* — F. CHAU & ASSOCIATES, LLC

(57) ABSTRACT

A display device includes a display panel including a plurality of pixels, a power management circuit which provides a power voltage to the plurality of pixels through a power line, a current sensing circuit which senses a panel current flowing through the power line and performs an analog-to-digital conversion for converting the panel current into a panel current code, and a controller which sets at least one of a conversion range, a conversion time, or a conversion sampling count of the analog-to-digital conversion based on a dimming value for controlling a luminance of an image displayed by the display panel.

19 Claims, 13 Drawing Sheets

(56) References Cited

U.S. PATENT DOCUMENTS

| | | | | | |
|---|---|---|---|---|---|
| 2009/0128477 | A1* | 5/2009 | Hayashi | G09G 3/20 | 345/98 |
| 2009/0201244 | A1* | 8/2009 | Park | G09G 3/3611 | 345/102 |
| 2011/0267387 | A1* | 11/2011 | Baik | G09G 3/3406 | 345/76 |
| 2013/0241950 | A1* | 9/2013 | Mihara | G09G 3/20 | 345/589 |
| 2016/0042699 | A1* | 2/2016 | Min | G09G 3/3413 | 345/82 |
| 2016/0071463 | A1* | 3/2016 | Takahashi | H10K 59/131 | 327/109 |
| 2020/0349881 | A1* | 11/2020 | Nadershahi | H05B 45/10 | |
| 2021/0201815 | A1* | 7/2021 | Bong | G09G 3/3266 | |
| 2023/0378972 | A1* | 11/2023 | Lin | H03M 1/462 | |
| 2025/0218404 | A1* | 7/2025 | Kwon | G09G 3/3233 | |

* cited by examiner

FIG. 13

<table>
<tr><th>DIM_GN</th><th>DIM_PK</th><th>CR</th><th>CT</th><th>CSC</th></tr>
<tr><td rowspan="2">LARGE</td><td>LARGE</td><td rowspan="2">±163.84mV</td><td>50us</td><td>1</td></tr>
<tr><td>SMALL</td><td>540us</td><td>64</td></tr>
<tr><td rowspan="2">SMALL</td><td>LARGE</td><td rowspan="2">±40.96mV</td><td>540us</td><td>64</td></tr>
<tr><td>SMALL</td><td>4120us</td><td>1024</td></tr>
</table>

DISPLAY DEVICE, CONTROLLER, AND METHOD OF DRIVING DISPLAY DEVICE

CROSS-REFERENCE TO RELATED APPLICATION(S)

This application claims priority under 35 USC § 119 to Korean Patent Application No. 10-2024-0028535 filed on Feb. 28, 2024, in the Korean Intellectual Property Office (KIPO), the entire disclosure of which is incorporated by reference herein.

BACKGROUND

1. Technical Field

Embodiments relate to a display device. More particularly, embodiments relate to a display device in which a panel current may be sensed, a controller included in the display device, and a method of driving the display device.

2. Discussion of Related Art

A display device may include a display panel and a current sensing circuit. The display panel may display an image. The current sensing circuit may sense a panel current flowing in the display panel.

When a luminance of the display panel is not adjusted based on a load of input image data, overcurrent may flow into the display panel, excess power consumption may occur, and the display panel may be damaged depending on a magnitude of the overcurrent.

SUMMARY

Embodiments provide a display device in which an analog-to-digital conversion of a panel current may be performed in consideration of a magnitude of the panel current.

Embodiments provide a controller which may set an analog-to-digital conversion of a panel current in consideration of a magnitude of the panel current.

Embodiments provide a method of driving a display device which may perform an analog-to-digital conversion of a panel current in consideration of a magnitude of the panel current.

A display device according to embodiments may include a display panel including a plurality of pixels, a power management circuit which provides a power voltage to the plurality of pixels through a power line, a current sensing circuit which senses a panel current flowing through the power line and performs an analog-to-digital conversion for converting the panel current into a panel current code, and a controller which sets at least one of a conversion range, a conversion time, or a conversion sampling count of the analog-to-digital conversion based on a dimming value for controlling a luminance of an image displayed by the display panel.

In an embodiment, the controller may set the conversion range such that the conversion range increases as the dimming value increases and the conversion range decreases as the dimming value decreases, may set the conversion time such that the conversion time decreases as the dimming value increases and the conversion time increases as the dimming value decreases, and may set the conversion sampling count such that the conversion sampling count decreases as the dimming value increases and the conversion sampling count increases as the dimming value decreases.

In an embodiment, the dimming value may include a dimming gain value for decreasing the luminance of the image in a total load section and a dimming peak value for decreasing the luminance of the image in a local load section.

In an embodiment, the controller may set the conversion range such that the conversion range increases as the dimming gain value increases and the conversion range decreases as the dimming gain value decreases.

In an embodiment, the controller may set the conversion time such that the conversion time decreases as the dimming gain value increases and the conversion time increases as the dimming gain value decreases.

In an embodiment, the controller may set the conversion sampling count such that the conversion sampling count decreases as the dimming gain value increases and the conversion sampling count increases as the dimming gain value decreases.

In an embodiment, the controller may set the conversion time such that the conversion time decreases as the dimming peak value increases and the conversion time increases as the dimming peak value decreases.

In an embodiment, the controller may set the conversion sampling count such that the conversion sampling count decreases as the dimming peak value increases and the conversion sampling count increases as the dimming peak value decreases.

In an embodiment, the controller may include a net power control block which determines a load of input image data and a scale factor based on the input image data, a net power control lookup table, and the dimming value, and a conversion setting block of the controller, which sets the at least one of the conversion range, the conversion time, or the conversion sampling count based on the dimming value, and provides the at least one of the conversion range, the conversion time, or the conversion sampling count to the current sensing circuit.

In an embodiment, the conversion setting block may include a conversion range setting block which sets the conversion range based on the dimming gain value, a conversion time setting block which sets the conversion time based on the dimming gain value and the dimming peak value, and a conversion sampling count setting block which sets the conversion sampling count based on the dimming gain value and the dimming peak value.

In an embodiment, the controller may further include a global current management block which receives the panel current code from the current sensing circuit, determines a target current code corresponding to the load of the input image data, and controls the power management circuit to supply the panel current according to a comparison of the panel current code with the target current code.

In an embodiment, the controller may further include an over-current protection block which receives the panel current code from the current sensing circuit, compares the panel current code with a reference over-current code, and controls the power management circuit to stop supplying the power voltage when the panel current code is greater than the reference over-current code.

In an embodiment, the current sensing circuit may include a conversion block which converts the panel current into the panel current code, and a setting register which stores the conversion range, the conversion time, and the conversion sampling count.

In an embodiment, the controller may be implemented as a controller integrated circuit, and the current sensing circuit may be implemented as a current sensing integrated circuit different from the controller integrated circuit.

In an embodiment, the controller may set the at least one of the conversion range, the conversion time, or the conversion sampling count by changing a value of the setting register via a bus connecting between the controller integrated circuit and the current sensing integrated circuit.

A controller of a display device according to embodiments may include a net power control block which determines a scale factor based on input image data, a net power control lookup table, and a dimming value for controlling a luminance of an image displayed by the display device, and a conversion setting block which sets at least one of a conversion range, a conversion time, or a conversion sampling count of an analog-to-digital conversion for converting a panel current into a panel current code based on the dimming value, and provides the at least one of the conversion range, the conversion time, or the conversion sampling count to a current sensing circuit which senses the panel current.

In an embodiment, the conversion setting block may set the conversion range such that the conversion range increases as the dimming value increases and the conversion range decreases as the dimming value decreases, may set the conversion time such that the conversion time decreases as the dimming value increases and the conversion time increases as the dimming value decreases, and may set the conversion sampling count such that the conversion sampling count decreases as the dimming value increases and the conversion sampling count increases as the dimming value decreases.

In an embodiment, the controller may be implemented as a controller integrated circuit, and the current sensing circuit may be implemented as a current sensing integrated circuit different from the controller integrated circuit. The conversion setting block may provide the at least one of the conversion range, the conversion time, or the conversion sampling count to the current sensing circuit via a bus connecting between the controller integrated circuit and the current sensing integrated circuit.

A method of driving a display device according to embodiments may include setting at least one of a conversion range, a conversion time, and a conversion sampling count of an analog-to-digital conversion for converting a panel current into a panel current code based on a dimming value for controlling a luminance of an image displayed by the display device, sensing a panel current, and performing the analog-to-digital conversion for converting the panel current into the panel current code.

In an embodiment, the setting may include at least one of setting the conversion range such that the conversion range increases as the dimming value increases and the conversion range decreases as the dimming value decreases, setting the conversion time such that the conversion time decreases as the dimming value increases and the conversion time increases as the dimming value decreases, or setting the conversion sampling count such that the conversion sampling count decreases as the dimming value increases and the conversion sampling count increases as the dimming value decreases.

In a display device, a controller, and a method of driving the display device according to embodiments, at least one of the conversion range, the conversion time, or the conversion sampling count of the analog-to-digital conversion for converting the panel current into the panel current code may be set based on the dimming value, and a current oscillation of the panel current may decrease when the panel current is low, and power consumption of the display device due to a rush current may decrease when the panel current is high.

BRIEF DESCRIPTION OF THE DRAWINGS

Illustrative, non-limiting embodiments will be more clearly understood from the following detailed description taken in conjunction with the accompanying drawings.

FIG. 13 is a table showing an example of setting values of an analog-to-digital conversion according to a dimming gain value and a dimming peak value.

DETAILED DESCRIPTION

Figure 1:
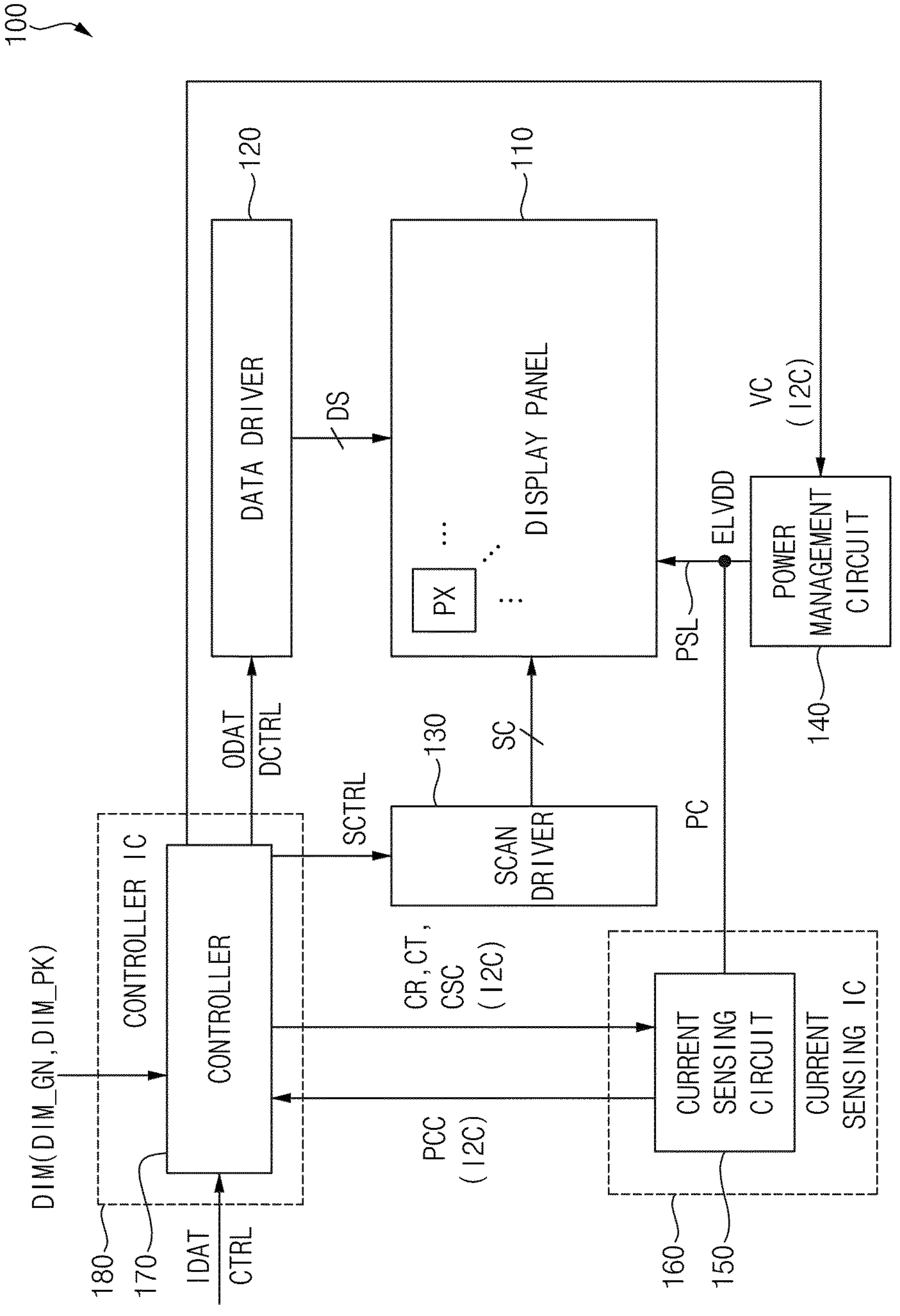
FIG. 1 is a block diagram showing a display device according to an embodiment.

Hereinafter, a display device, a controller, and a method of driving a display device according to embodiments of the present disclosure will be described in more detail with reference to the accompanying drawings. Inventive concepts may be implemented in various modifications and have various forms. It is to be understood, however, that the inventive concepts are not intended to be limited to the particular forms disclosed, but on the contrary, is intended to cover all modifications, equivalents, and alternatives falling within the spirit and scope of the inventive concepts. The same or similar reference numerals will be used for the same elements in the accompanying drawings. In the drawings, the thicknesses, the ratios, and the dimensions of the elements may be exaggerated for the effective description of the technical contents.

According to an embodiment, a current sensing circuit may perform analog-to-digital conversion for converting an analog panel current into a digital panel current. The display device may perform operations, including a global current management (GCM) operation or an over-current protection operation based on the analog panel current converted into the digital panel current. Further, the display device may detect a rush current flowing in the display panel based on the digital panel current.

Figure 2:
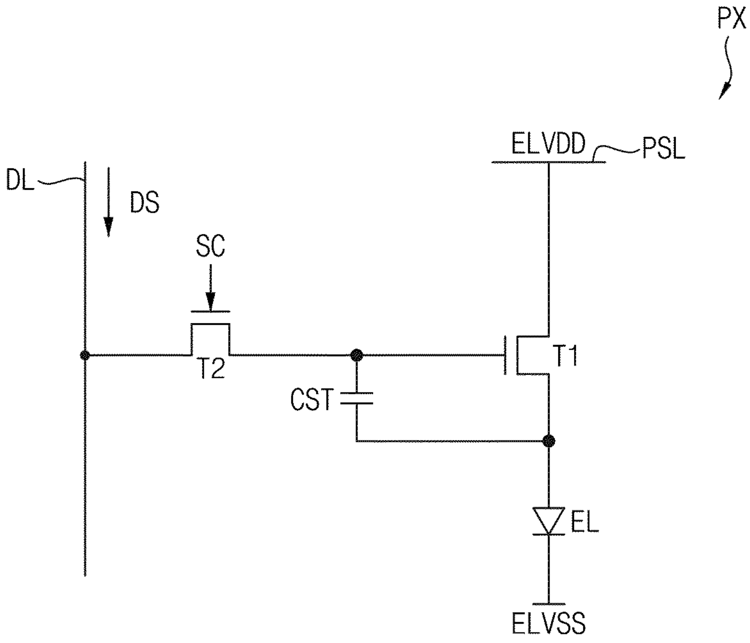
FIG. 2 is a circuit diagram showing an example of a pixel of FIG. 1.
Figure 3:
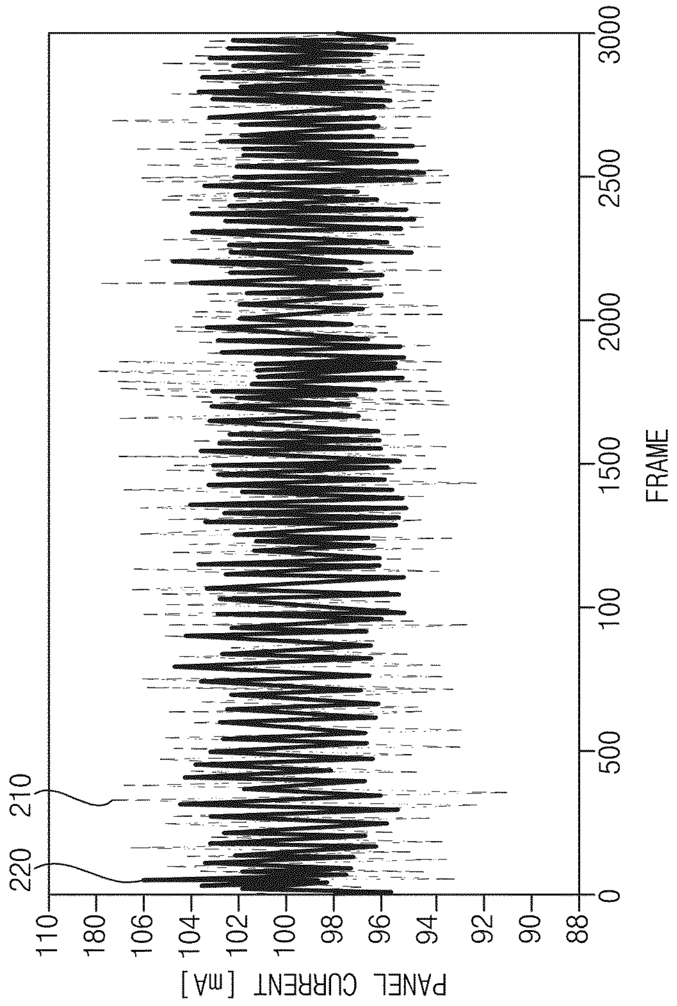
FIG. 3 is a view showing a panel current for each conversion range of an analog-to-digital conversion.
Figure 4:
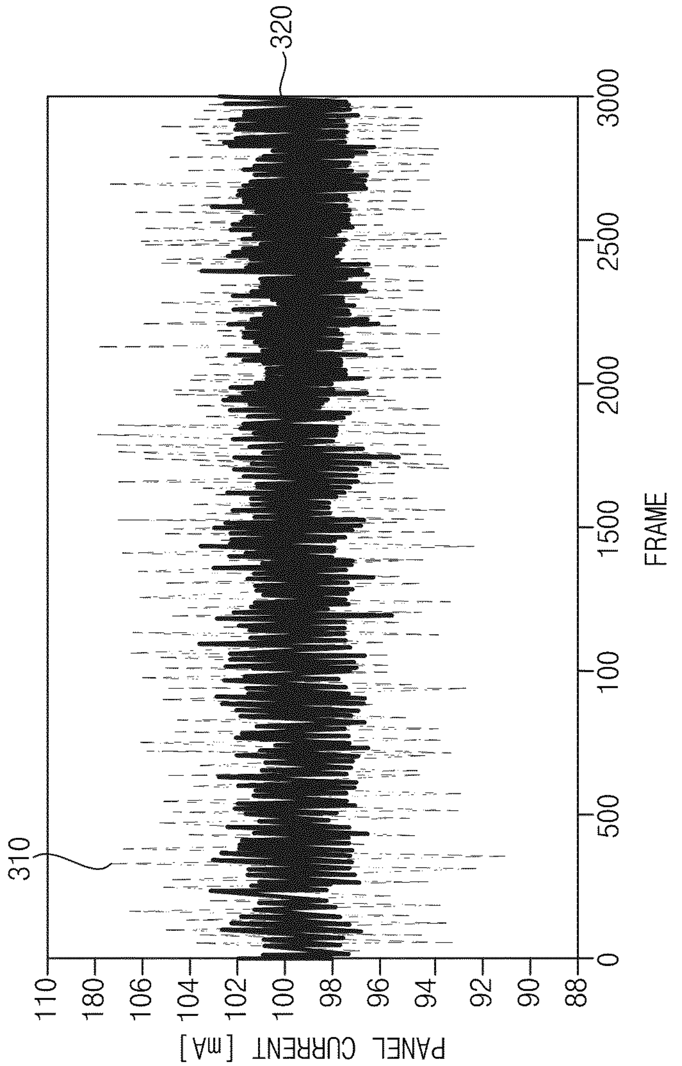
FIG. 4 is a view showing a panel current for each conversion time of an analog-to-digital conversion.
Figure 5:
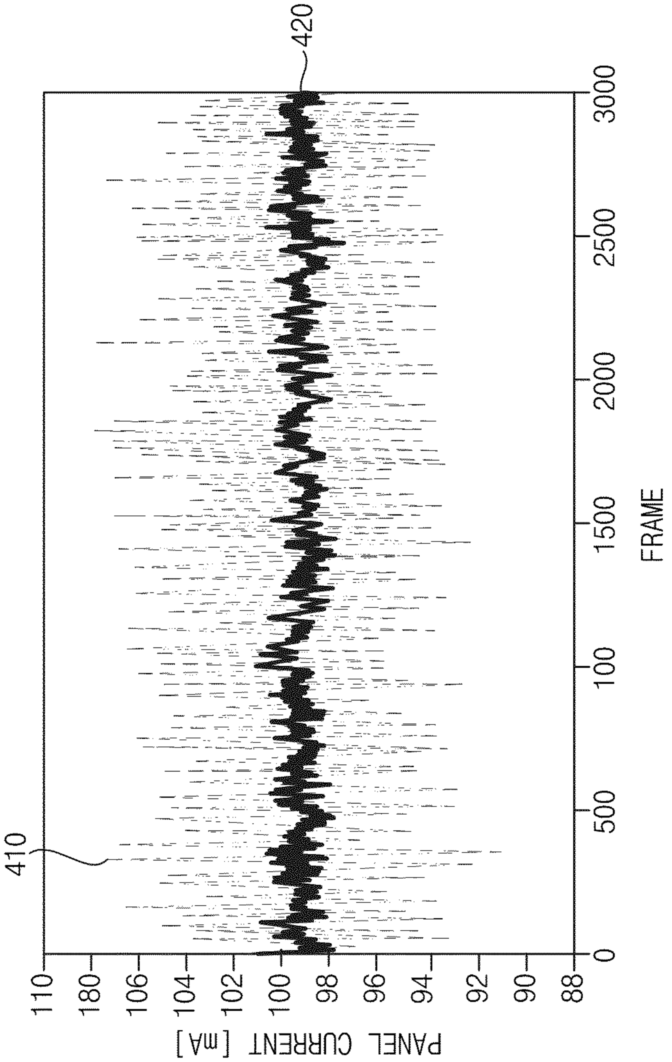
FIG. 5 is a view showing a panel current for each conversion sampling count of an analog-to-digital conversion.
Figure 6:
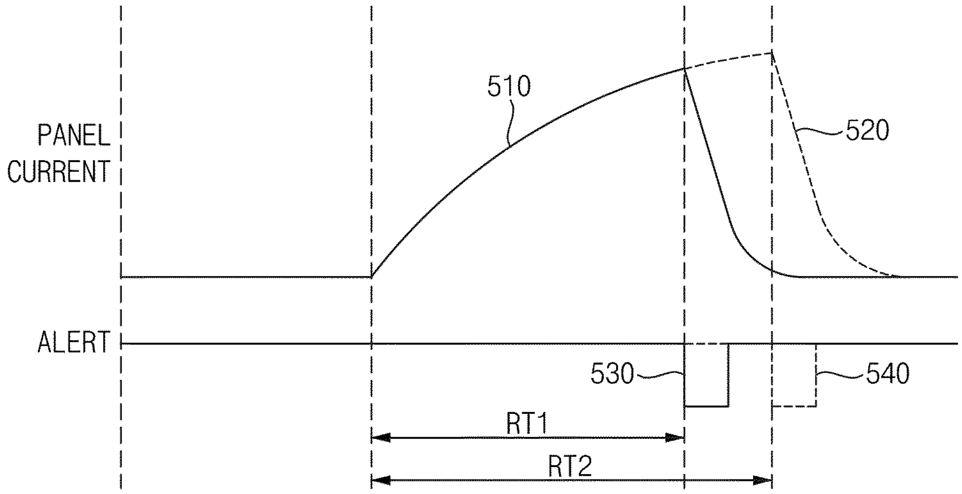
FIG. 6 is a view showing a panel current for each conversion time of an analog-to-digital conversion when a rush current occurs.
Figure 7:
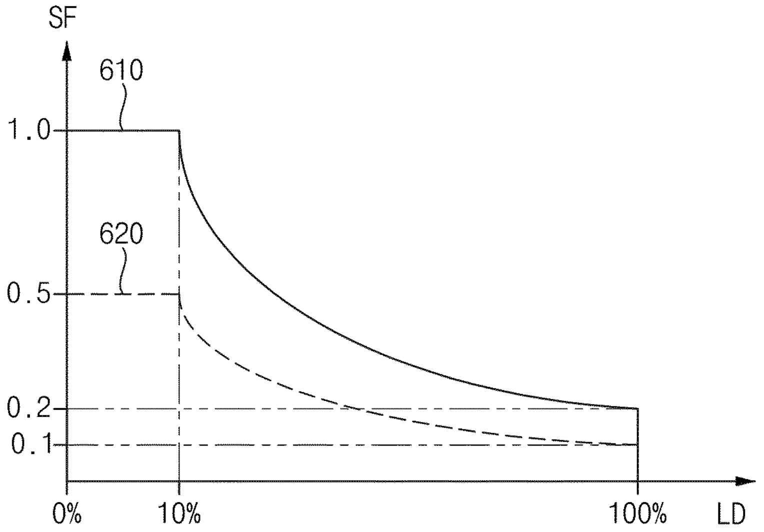
FIG. 7 is a graph showing a scale factor for each dimming gain value.
Figure 8:
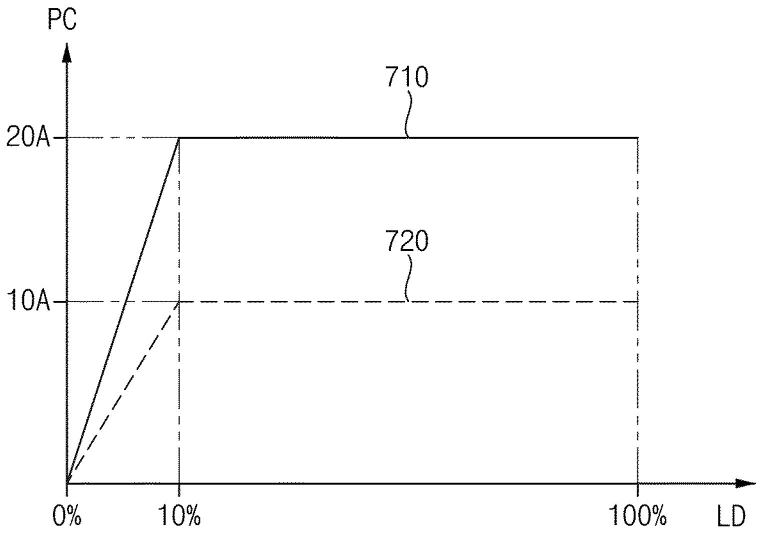
FIG. 8 is a graph showing a panel current for each dimming gain value.
Figure 9:
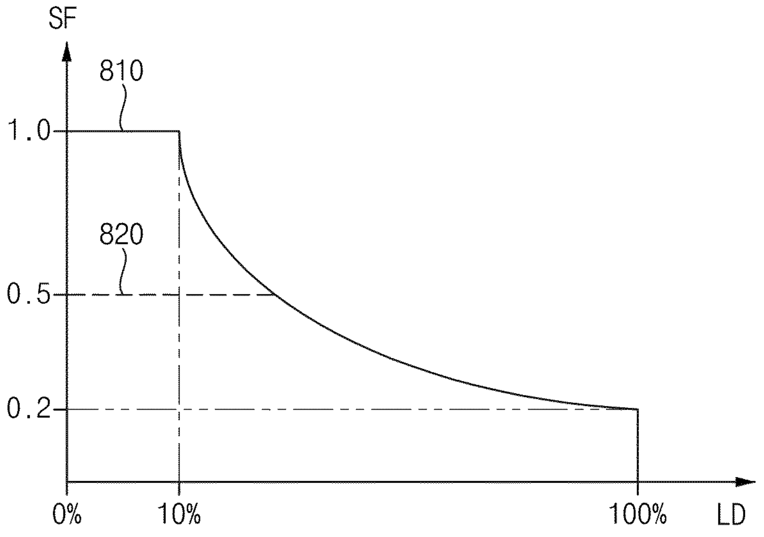
FIG. 9 is a graph showing a scale factor for each dimming peak value.
Figure 10:
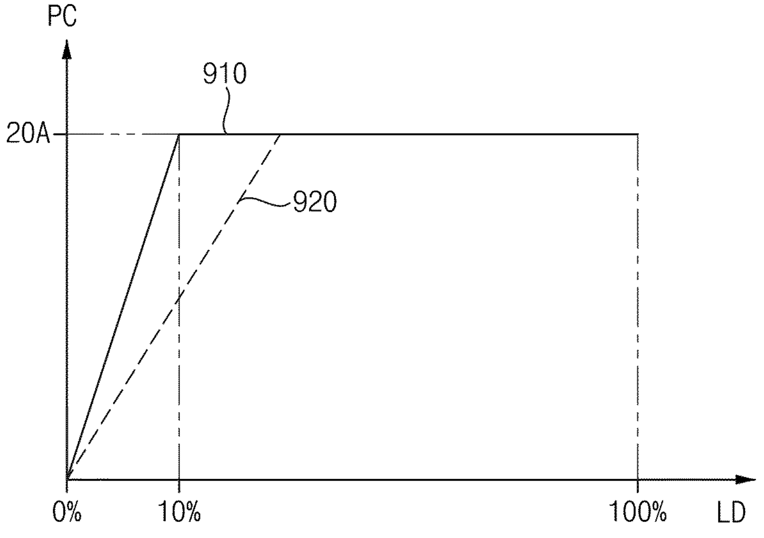
FIG. 10 is a graph showing a panel current for each dimming peak value.
Figure 11:
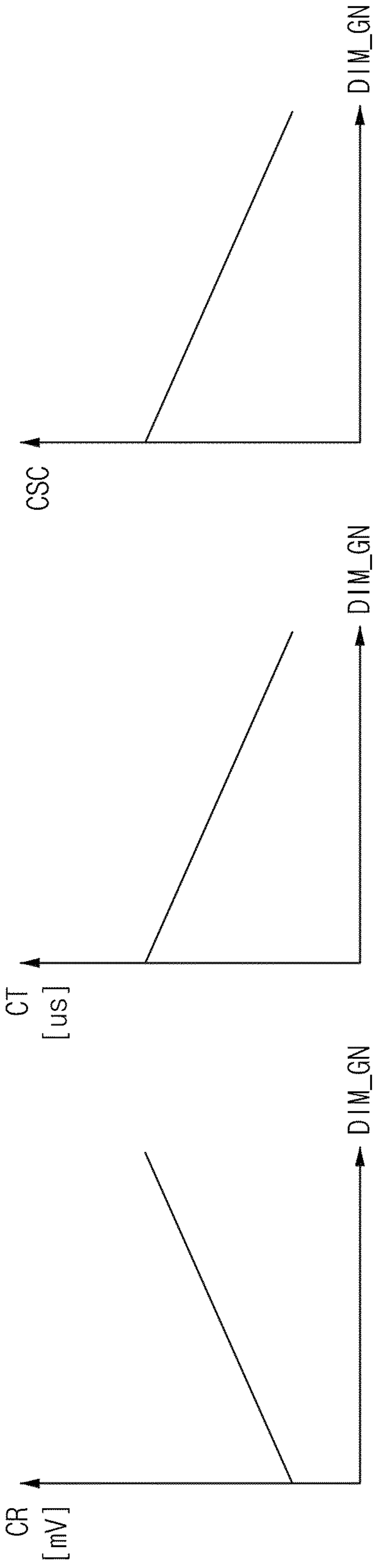
FIG. 11 is a graph showing a relationship between a dimming gain value and setting values of an analog-to-digital conversion.
Figure 12:
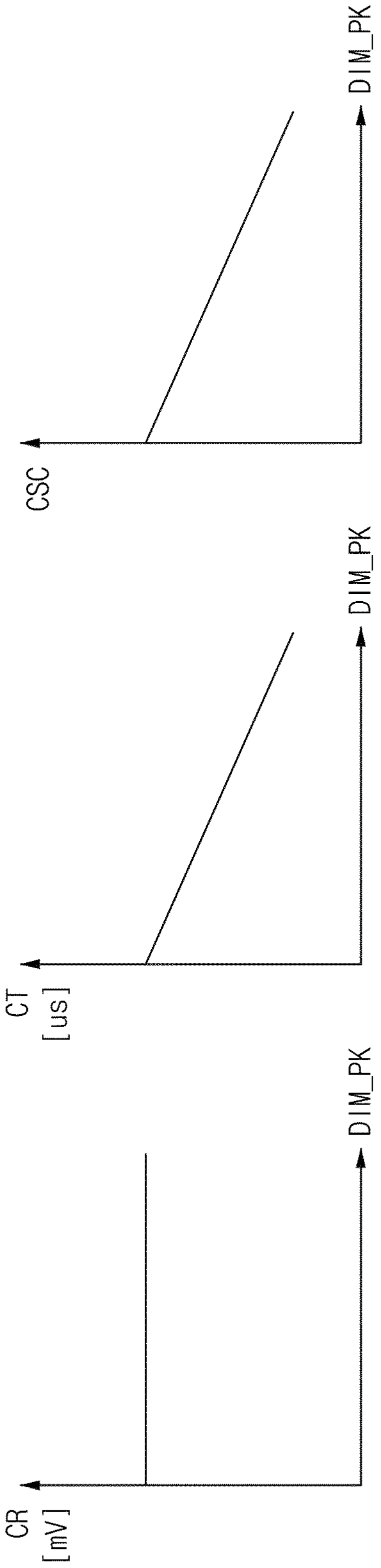
FIG. 12 is a graph showing a relationship between a dimming peak value and setting values of an analog-to-digital conversion.
Figure 14:
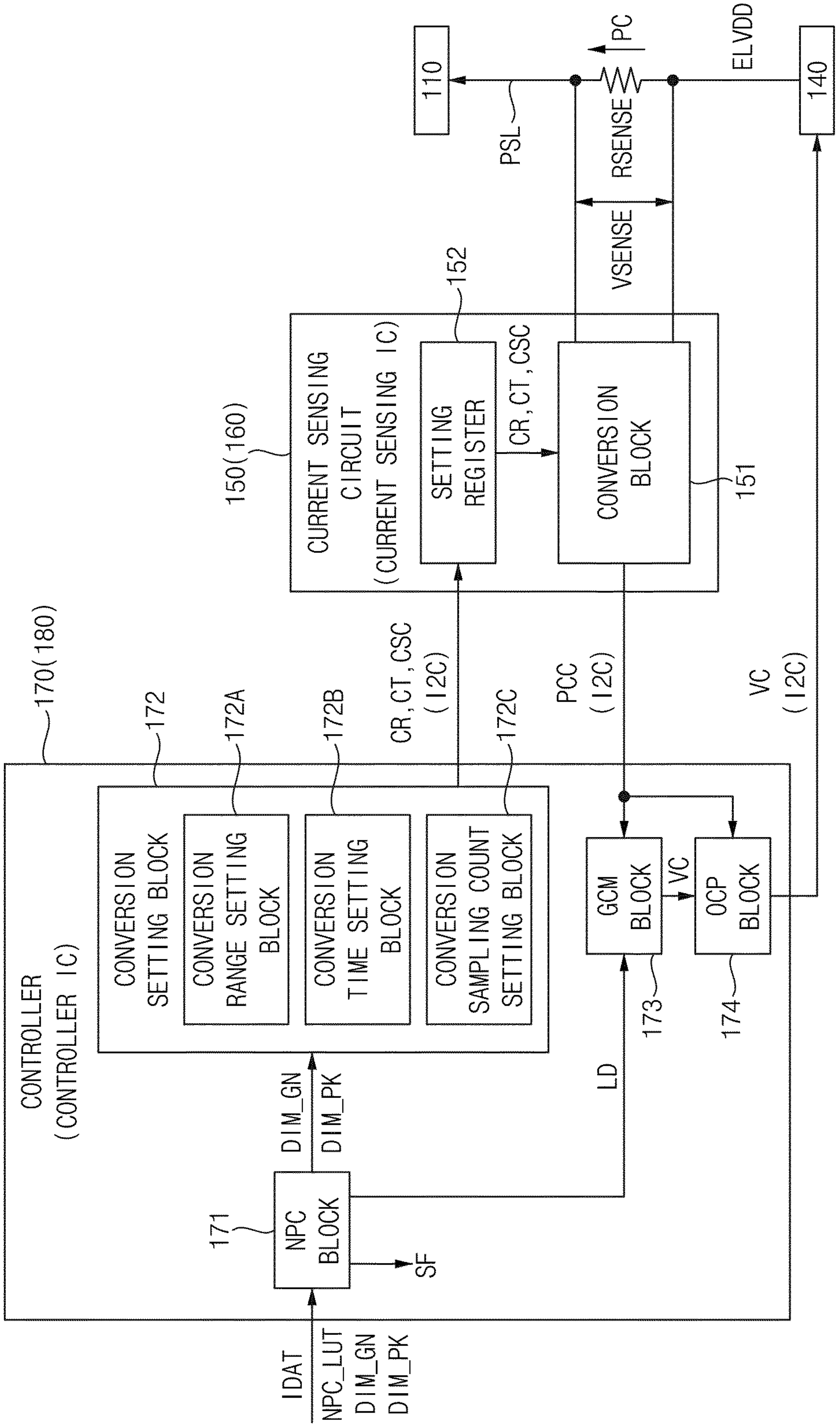
FIG. 14 is a block diagram showing a current sensing circuit and a controller according to an embodiment.
Figure 15:
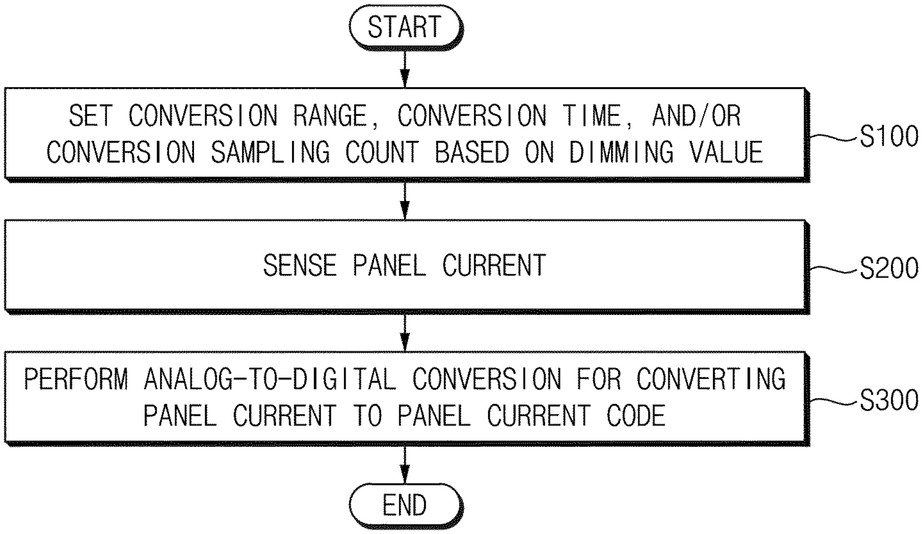
FIG. 15 is a flowchart showing a method of driving a display device according to an embodiment.
Figure 16:
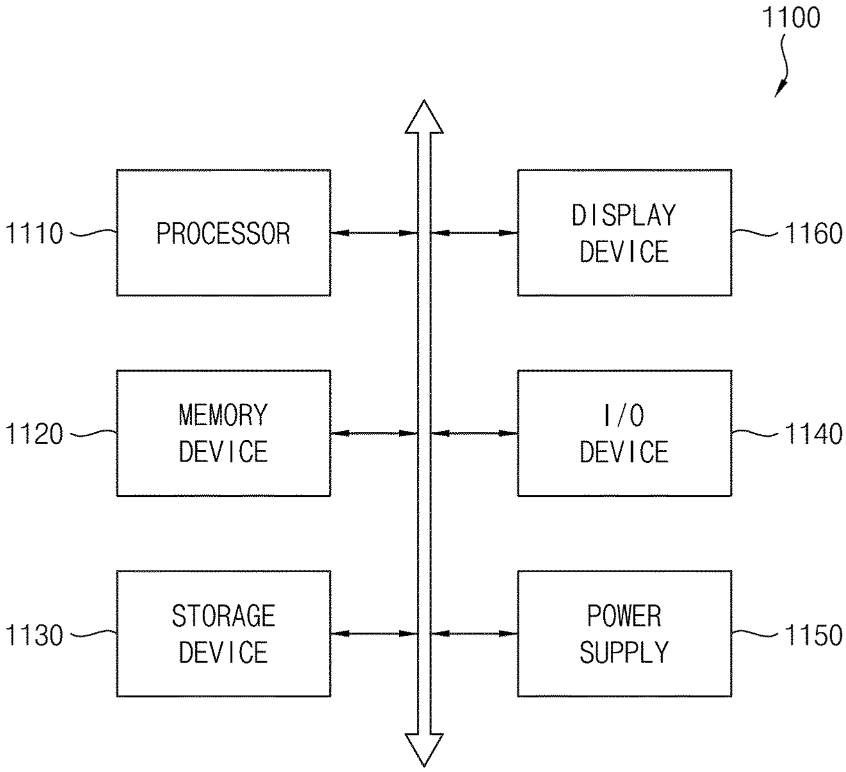
FIG. 16 is a block diagram showing an electronic apparatus according to an embodiment.

FIG. 1 is a block diagram showing a display device 100 according to an embodiment. FIG. 2 is a circuit diagram showing an example of a pixel PX of FIG. 1. FIG. 3 is a view showing a panel current for each conversion range CR of an analog-to-digital conversion. FIG. 4 is a view showing a panel current for each conversion time CT of an analog-to-digital conversion. FIG. 5 is a view showing a panel current for each conversion sampling count CSC of an analog-to-digital conversion. FIG. 6 is a view showing a panel current for each conversion time CT of an analog-to-digital conversion when a rush current occurs. FIG. 7 is a graph showing a scale factor SF for each dimming gain value DIM_GN. FIG. 8 is a graph showing a panel current PC for each dimming gain value DIM_GN. FIG. 9 is a graph showing a scale factor SF for each dimming peak value DIM_PK. FIG. 10 is a graph showing a panel current PC for each dimming peak value DIM_PK. FIG. 11 is a graph showing a relationship between a dimming gain value DIM_GN and setting values CR, CT, and CSC of an analog-to-digital conversion. FIG. 12 is a graph showing a relationship between a dimming peak value DIM_PK and setting values CR, CT, and CSC of an analog-to-digital conversion. FIG. 13 is a table showing an example of setting values CR, CT, and CSC of an analog-to-digital conversion according to a dimming gain value DIM_GN and a dimming peak value DIM_PK. FIG. 14 is a block diagram showing a current sensing circuit 150 and a controller 170 according to an embodiment. FIG. 15 is a flowchart showing a method of driving a display device according to an embodiment. FIG. 16 is a block diagram showing an electronic apparatus 1100 according to an embodiment.

Referring to FIG. 1, a display device 100 according to an embodiment may include a display panel 110, a data driver 120, a scan driver 130, a power management circuit 140, a current sensing circuit 150, and a controller 170.

The display panel 110 may include a plurality of pixels PX. The display panel 110 may display an image. For example, the display panel 110 may display an image through light emitted from each of the pixels PX.

Referring to FIG. 2, the pixel PX may include a first transistor T1, a second transistor T2, a storage capacitor CST, and a light-emitting element EL.

The first transistor T1 may include a gate connected to a second electrode of the second transistor T2 and a first electrode of the storage capacitor CST, a first electrode connected to a power line PSL transmitting a first power voltage ELVDD, and a second electrode connected to a second electrode of the storage capacitor CST and an anode of the light-emitting element EL.

The second transistor T2 may include a gate receiving a scan signal SC, a first electrode connected to a data line DL transmitting a data signal DS, and the second electrode connected to the gate of the first transistor T1 and the first electrode of the storage capacitor CST.

The storage capacitor CST may include the first electrode connected to the gate of the first transistor T1 and the second electrode of the second transistor T2, and the second electrode connected to the second electrode of the first transistor T1 and the anode of the light-emitting element EL.

The light-emitting element EL may include the anode connected to the second electrode of the first transistor T1 and the second electrode of the storage capacitor CST, and a cathode receiving a second power supply voltage ELVSS.

In an embodiment, the light-emitting element EL may be an organic light-emitting diode (OLED). In an embodiment, the light-emitting element EL may be an inorganic light-emitting diode, a micro light-emitting diode, or a quantum-dot light-emitting diode (QLED).

Referring to FIG. 1, the data driver 120 may supply data signals DS to the pixels PX of the display panel 110. The data driver 120 may generate the data signals DS based on output image data ODAT and a data control signal DCTRL. The output image data ODAT may include grayscale values corresponding to the pixels PX. The data control signal DCTRL may include an output data enable signal, a horizontal start signal, or a load signal. Embodiments are not limited thereto, and the data control signal DCTRL may include another signal.

The scan driver 130 may supply scan signals SC to the pixels PX of the display panel 110. The scan driver 130 may generate the scan signals SC based on a scan control signal SCTRL. The scan control signal SCTRL may include a scan start signal or a scan clock signal. Embodiments are not limited thereto, and the scan control signal SCTRL may include another signal.

The power management circuit 140 may supply the first power voltage ELVDD to the pixels PX of the display panel 110 through the power line PSL. The power management circuit 140 may generate the first power voltage ELVDD based on a power control signal VC. The power management circuit 140 may be implemented as a power management integrated circuit.

The current sensing circuit 150 may sense a panel current PC flowing through the power line PSL. The panel current PC may be a global current. The panel current PC may be a global current that is the sum of driving currents flowing through the light-emitting elements EL of the pixels PX. The current sensing circuit 150 may perform an analog-to-digital conversion. The current sensing circuit 150 may convert the panel current PC into a panel current code PCC. Specifically, the analog-to-digital conversion may include a sampling operation that may sample a sensing voltage corresponding to the panel current PC and a quantization and encoding operation that may convert the sampled sensing voltage into the panel current code PCC.

The current sensing circuit 150 may receive at least one of a conversion range CR, a conversion time CT, or a conversion sampling count CSC. For example, the current sensing circuit 150 may be set using the conversion range CR, the conversion time CT, and the conversion sampling count CSC of the analog-to-digital conversion, and the current sensing circuit 150 may perform the analog-to-digital conversion based on the conversion range CR, the conversion time CT, and the conversion sampling count CSC.

The conversion range CR may indicate a range of the sensing voltage to be sampled. As the conversion range CR increases, a wider range of the panel current PC may be converted into the panel current code PCC. As the conversion range CR increases, a resolution of the panel current PC converted into the panel current code PCC may decrease, and quantization noise may increase during an analog-to-digital conversion. In other words, as the conversion range CR decreases, the resolution of the panel current PC converted into the panel current code PCC may increase, and the quantization noise may decrease during an analog-to-digital conversion. A first line 210 of FIG. 3 may be the panel current indicated by the panel current code PCC when the conversion range CR is about ±163.84 mV, and a second line 220 of FIG. 3 may be the panel current indicated by the panel current code PCC when the conversion range CR is about ±40.96 mV. The quantization noise of an analog-to-digital conversion when the conversion range CR is about ±40.96 mV may be less than the quantization noise of an analog-to-digital conversion when the conversion range CR is about ±163.84 mV, and a current oscillation of the panel current shown by the second line 220 indicated by the panel current code PCC when the conversion range CR is about ±40.96 mV may be less than a current oscillation of the panel current shown by the first line 210 indicated by the panel current code PCC when the conversion range CR is about ±163.84 mV.

The conversion time CT may indicate a time taken to convert the sampled sensing voltage into the panel current code PCC. In other words, the conversion time CT may indicate a time for the quantization and encoding operation. As the conversion time CT increases, the quantization noise may decrease in the analog-to-digital conversion. A third line 310 of FIG. 4 may be the panel current indicated by the panel current code PCC when the conversion time CT is about 50 microseconds (us), and a fourth line 320 of FIG. 4 may be the panel current indicated by the panel current code PCC when the conversion time CT is about 140 us. The quantization noise of the analog-to-digital conversion when the conversion time CT is about 140 us may be less than the quantization noise of the analog-to-digital conversion when the conversion time CT is about 50 us, and a current oscillation of the panel current shown by the fourth line 320 indicated by the panel current code PCC when the conversion time CT is about 140 us may be less than a current oscillation of the panel current shown by the third line 310 indicated by the panel current code PCC when the conversion time CT is about 50 us.

The conversion sampling count CSC may indicate a number of times sampling operations of the sensing voltages are performed before the quantization and encoding operation. When the conversion sampling count CSC is 1, a sensing voltage sampled once may be converted into the panel current code PCC. When the conversion sampling count CSC is greater than 1, an average of sensing voltages sampled multiple times may be converted into the panel current code PCC. In an embodiment, as the conversion sampling count CSC increases, the quantization noise in the analog-to-digital conversion may decrease. A fifth line 410 of FIG. 5 may be the panel current indicated by the panel current code PCC when the conversion sampling count CSC is 1, and a sixth line 420 of FIG. 5 may be the panel current indicated by the panel current code PCC when the conversion sampling count CSC is 16. The quantization noise of the analog-to-digital conversion when the conversion sampling count CSC is 16 may be less than the quantization noise of the analog-to-digital conversion when the conversion sampling count CSC is 1, and a current oscillation of the panel current shown by the sixth line 420 indicated by the panel current code PCC when the conversion sampling count CSC is 16 may be less than a current oscillation of the panel current shown by the fifth line 410 indicated by the panel current code PCC when the conversion sampling count CSC is 1.

When the panel current PC is low, as a ratio of the magnitude of the current oscillation of the panel current PC to the magnitude of the panel current PC may increase, and an influence of the current oscillation of the panel current PC may be high. When the display panel 110 displays a low-grayscale image, the panel current PC may be low, and flicker due to the current oscillation of the panel current PC may be recognized in the low-grayscale image. Further, when the panel current PC is low in a global current management (GCM) operation and an over-current protection (OCP) operation performed based on the panel current PC, the current oscillation of the panel current PC may be reduced as described herein.

The display device 100 may detect a rush current generated in the display panel 110 through the panel current PC sensed by the current sensing circuit 150. A rush current may be a current of the display panel 110 that is greater than a rush reference current. The rush reference current may be a current level associated with an increased level of power consumption of the display device 100. The rush reference current may be predetermined current level. When the panel current PC becomes greater than the rush reference current, an alert signal may be generated, and the power management circuit 140 may decrease the first power voltage ELVDD in response to the alert signal, and the power consumption of the display device 100 may be reduced.

As the conversion range CR decreases, a narrow range of panel current PC may be converted into the panel current code PCC, and as the conversion range CR decreases, limitations may arise in detecting a rush current through the panel current PC.

As the conversion time CT increases, a time taken to convert the panel current PC into the panel current code PCC may increase, and a response time to a rush current may increase. Further, as the conversion time CT increases, the power consumption of the display device 100 due to a rush current may increase. A first plot 510 of FIG. 6 may be the panel current indicated by the panel current code PCC when the conversion time CT is about 80 us and a second plot 520 of FIG. 6 may be the panel current indicated by the panel current code PCC when the conversion time CT is about 320 us. A first signal 530 of FIG. 6 may be a pulse of the alert signal ALERT when the conversion time CT is about 80 us, and a second signal 540 of FIG. 6 may be a pulse of the alert signal ALERT when the conversion time CT is about 320 us. A first response time RT1 of FIG. 6 may be the response time to a rush current when the conversion time CT is about 80 us, and a second response time RT2 of FIG. 6 may be the response time to a rush current when the conversion time CT is about 320 us. The second response time RT2 to a rush current when the conversion time CT is about 320 us may be greater than the first response time RT1 to a rush current when the conversion time CT is about 80 us. A maximum value of the second plot 520 of the panel current, which may be a rush current, when the conversion time CT is about 320 us may be greater than a maximum value of the first plot 510 of the panel current, which may also be a rush current, when the conversion time CT is about 80 us.

As the conversion sampling count CSC increases, a time taken to convert the panel current PC into the panel current code PCC may increase, and the response time to a rush current may increase. Further, as the conversion sampling count CSC increases, the power consumption of the display device 100 due to a rush current may increase.

When the panel current PC is high, as the power consumption of the display device 100 due to a rush current increases, the influence of the response time to a rush current may be high. Further, when the panel current PC is high, as the ratio of the magnitude of the current oscillation of the panel current PC to the magnitude of the panel current PC decreases, the influence of the current oscillation of the panel current PC may be low.

The current sensing circuit 150 may be implemented as a current sensing integrated circuit 160. The current sensing circuit 150 may be implemented as a current sensing integrated circuit 160 different from the power management circuit 140. For example, the power management circuit 140 and the current sensing integrated circuit 160 may be implemented as distinct circuits. In an example, the power management circuit 140 and the current sensing integrated circuit 160 may be implemented in different chips.

The controller 170 may control an operation of the data driver 120, an operation of the scan driver 130, and an operation of the power management circuit 140. The controller 170 may supply the output image data ODAT and the data control signal DCTRL to the data driver 120. The controller 170 may generate the output image data ODAT based on input image data IDAT. The input image data IDAT may include grayscale values corresponding to the pixels PX. The controller 170 may generate the data control signal DCTRL based on a control signal CTRL. The control signal CTRL may include a vertical synchronization signal, a horizontal synchronization signal, an input data enable signal, and a master clock signal. Embodiments are not limited thereto, and the control signal CTRL may include another signal.

The controller 170 may supply the scan control signal SCTRL to the scan driver 130. The controller 170 may generate the scan control signal SCTRL based on the control signal CTRL.

The controller 170 may supply the power control signal VC to the power management circuit 140. The controller 170 may generate the power control signal VC based on the control signal CTRL and the power current code PCC.

The controller 170 may be implemented as a controller integrated circuit 180 different from a power management integrated circuit and the current sensing integrated circuit 160.

The controller 170 may provide at least one of the conversion range CR, the conversion time CT, or the conversion sampling count CSC to the current sensing circuit 150. For example, the controller 170 may provide at least one of the conversion range CR, the conversion time CT, or the conversion sampling count CSC to the current sensing circuit 150 via a bus connecting between the controller integrated circuit 180 and the current sensing integrated circuit 160. In an embodiment, the controller 170 may provide at least one of the conversion range CR, the conversion time CT, or the conversion sampling count CSC to the current sensing circuit 150 via a bus connecting between the controller integrated circuit 180 and the current sensing integrated circuit 160. For example, the bus may support an Inter-Integrated Circuit (I2C) communication. The I2C communication may use a multi-controller/multi-target, single-ended, serial communication bus.

The current sensing circuit 150 may provide the power current code PCC to the controller 170. For example, the current sensing circuit 150 may provide the power current code PCC to the controller 170 via the I2C communication between the current sensing integrated circuit 160 and the controller integrated circuit 180.

The controller 170 may provide the power control signal VC to the power management circuit 140. For example, the controller 170 may provide the power control signal VC to the power management circuit 140 via the I2C communication between the controller integrated circuit 180 and the power management circuit 140.

The controller 170 may receive a dimming value DIM from outside the display device 100. For example, the controller 170 may receive the dimming value DIM from a host processor. The dimming value DIM may be a value set so that the display device 100 may display an image having a target luminance level.

The controller 170 may perform a net power control (NPC) operation. The controller 170 may perform a net power control (NPC) operation for controlling a luminance of an image displayed by the display panel 110 based on a load of the input image data IDAT. The controller 170 may perform the NPC operation, which may decrease the luminance of an image displayed by the display panel 110 based on the load of the input image data IDAT. The controller 170 may generate a net power control curve based on a reference net power control curve and the dimming value DIM. Each of the reference net power control curve and the net power control curve may represent a scale factor in a total load section (e.g., 0% to 100%) of an image. For example, when the input image data IDAT is a full black image, a total load value of the input image data IDAT may be 0%, and when the input image data IDAT is a full white image, the total load value of the input image data IMG may be 100%. The scale factor may be greater than 0 and less than or equal to 1. The dimming value DIM may be a value for decreasing the luminance of the image displayed by the display panel 110. The controller 170 may determine the load of the input image data IDAT based on the input image data IDAT, and may determine the scale factor based on the net power control curve and the load of the input image data IDAT. The load of the input image data IDAT may be greater than or equal to 0% and less than or equal to 100%. The controller 170 may generate the grayscale values of the output image data ODAT by applying the scale factor to the grayscale values of the input image data IDAT.

The dimming value DIM may include a dimming gain value DIM_GN and a dimming peak value DIM_PK. The dimming gain value DIM_GN may be a value for controlling the luminance of the image. For example, the dimming gain value DIM_GN may be a value for controlling the luminance of the image in the total load section. As the dimming gain value DIM_GN decreases, the scale factor may decrease in the total load section. In an embodiment, as the dimming gain value DIM_GN decreases, the grayscale values of the output image data ODAT may decrease in the total load section, and the magnitude of the panel current PC may decrease in the total load section. In an embodiment, as the dimming gain value DIM_GN decreases, the influence of the current oscillation of the panel current PC in the total load section may increase. A third plot 610 of FIG. 7 is the net power control curve when the dimming gain value DIM_GN is 1, a fourth plot 620 of FIG. 7 is the net power control curve when the dimming gain value DIM_GN is 0.5, a fifth plot 710 of FIG. 8 is the panel current in the total load section when the dimming gain value DIM_GN is 1, and a sixth plot 720 of FIG. 8 is the panel current in the total load section when the dimming gain value DIM_GN is 0.5. The sixth plot 720 of the panel current in the total load section when the dimming gain value DIM_GN is 0.5 may be less than the fifth plot 710 of the panel current in the total load section when the dimming gain value DIM_GN is 1. In an embodiment, the influence of the current oscillation of the sixth plot 720 of the panel current in the total load section when the dimming gain value DIM_GN is 0.5 may be greater than the influence of the current oscillation of the fifth plot 710 of the panel current in the total load section when the dimming gain value DIM_GN is 1.

The dimming peak value DIM_PK may be a value for decreasing the luminance of the image in a local load section. The local load section may be a portion of the total load section. For example, the local load section may correspond to an object within an image being displayed by the display panel 110. As the dimming peak value DIM_PK decreases, the scale factor may decrease in the local load section. In an embodiment, as the dimming peak value DIM_PK decreases, the grayscale values of the output image data ODAT in the local load section may decrease, and the magnitude of the panel current PC in the local load section may decrease. In an embodiment, as the dimming peak value DIM_PK decreases, the influence of the current oscillation of the panel current PC in the local load section may increase. A seventh plot 810 of FIG. 9 is the net power control curve when the dimming peak value DIM_PK is 1, and a eighth plot 820 of FIG. 9 is the net power control curve when the dimming peak value DIM_PK is 0.5. A nineth plot 910 of FIG. 10 is the panel current in the total load section when the dimming peak value DIM_PK is 1, and a tenth plot 920 of FIG. 10 is the panel current in the total load section when the dimming peak value DIM_PK is 0.5. The tenth plot 920 of the panel current in the local load section when the dimming peak value DIM_PK is 0.5 may be less than the nineth plot 910 of the panel current in the local load section when the dimming peak value DIM_PK is 1. Further, the influence of the current oscillation of the tenth plot 920 of the panel current in the local load section when the dimming peak value DIM_PK is 0.5 may be greater than the influence of the current oscillation of the nineth plot 910 of the panel current in local low load section when the dimming peak value DIM_PK is 1.

In the display device 100 according to an embodiment, the controller 170 may set at least one of the conversion range CR, the conversion time CT, or the conversion sampling count CSC of the analog-to-digital conversion based on the dimming value DIM. The magnitude of the panel current PC may change depending on the dimming value DIM. The influence of the current oscillation of the panel current PC and the power consumption of the display device 100 due to a rush current may change depending on the magnitude of the panel current PC. The controller 170 may set at least one of the conversion range CR, the conversion time CT, or the conversion sampling count CSC in consideration of the influence of the current oscillation of the panel current PC when the dimming value DIM is low, and the dimming value DIM may be low when the panel current PC is low. The controller 170 may set at least one of the conversion range CR, the conversion time CT, or the conversion sampling count CSC in consideration of the power consumption of the display device 100 due to a rush current when the dimming value DIM is high, and the dimming value DIM may be high when the panel current PC is high.

The controller 170 may set the conversion range CR such that the conversion range CR increases as the dimming value DIM increases, and the conversion range CR decreases as the dimming value DIM decreases. In a case that the panel current PC increases as the dimming value DIM increases, the conversion range CR may increase in consideration of the detection of a rush current. Further, in a case that the panel current PC decreases as the dimming value DIM decreases, the conversion range CR may decrease in consideration of the influence of the current oscillation of the panel current PC.

The controller 170 may set the conversion time CT such that the conversion time CT decreases as the dimming value DIM increases and the conversion time CT increases as the dimming value DIM decreases. Further, the controller 170 may set the conversion sampling count CSC such that the conversion sampling count CSC decreases as the dimming value DIM increases, and the conversion sampling count CSC increases as the dimming value DIM decreases. In the case that the panel current PC increases as the dimming value DIM increases, the conversion time CT and the conversion sampling count CSC may decrease in consideration of the response time to a rush current. Further, in the case that the panel current PC decreases as the dimming value DIM decreases, the conversion time CT and the conversion sampling count CSC may increase in consideration of the influence of the current oscillation of the panel current PC.

The controller 170 may set the conversion range CR such that the conversion range CR increases as the dimming gain value DIM_GN increases and the conversion range CR decreases as the dimming gain value DIM_GN decreases, as shown in FIG. 11. In the case that the panel current PC increases in the total load section as the dimming gain value DIM_GN increases, the conversion range CR may increase in consideration of the detection of a rush current. Further, in the case that the panel current PC decreases in the total load section as the dimming gain value DIM_GN decreases, the conversion range CR may decrease in consideration of the influence of the current oscillation of the panel current PC.

The controller 170 may set the conversion time CT such that the conversion time CT decreases as the dimming gain value DIM_GN increases and the conversion time CT increases as the dimming gain value DIM_GN decreases, as shown in FIG. 11. Further, the controller 170 may set the conversion sampling count CSC such that the conversion sampling count CSC decreases as the dimming gain value DIM_GN increases and the conversion sampling count CSC increases as the dimming gain value DIM_GN decreases, as shown in FIG. 11. In a case that the panel current PC increases in the total load section as the dimming gain value DIM_GN increases, the conversion time CT and the conversion sampling count CSC may decrease in consideration of the response time to a rush current. Further, in the case that the panel current PC decreases in the total load section as the dimming gain value DIM_GN decreases, the conversion time CT and the conversion sampling count CSC may increase in consideration of the influence of the current oscillation of the panel current PC.

The controller 170 may set the conversion time CT such that the conversion time CT decreases as the dimming peak value DIM_PK increases and the conversion time CT increases as the dimming peak value DIM_PK decreases, as shown in FIG. 12. Further, the controller 170 may set the conversion sampling count CSC such that the conversion sampling count CSC decreases as the dimming peak value DIM_PK increases and the conversion sampling count CSC increases as the dimming peak value DIM_PK decreases, as shown in FIG. 12. In a case that the panel current PC increases in the local load section as the dimming peak value DIM_PK increases, the conversion time CT and the conversion sampling count CSC may decrease in consideration of the response time for a rush current. Further, in the case that the panel current PC decreases in the local load section as the dimming peak value DIM_PK decreases, the conversion time CT and the conversion sampling count CSC may increase in consideration of the influence of the current oscillation of the panel current PC.

The controller 170 may set the conversion range CR regardless of the magnitude of the dimming peak value DIM_PK, as shown in FIG. 12. For example, the controller 170 may set the conversion range CR in consideration of the dimming gain value DIM_GN only. The dimming peak value DIM_PK may affect the scale factor and the panel current PC in the local load section, and may not affect the scale factor and the panel current PC in a high load section (e.g., a section where the load is close to 100%), unless the dimming peak value DIM_PK is set low, the dimming peak value DIM_PK may not be considered in setting the conversion range CR.

FIG. 13 shows an example of the conversion range CR, the conversion time CT, and the conversion sampling count CSC of the analog-to-digital conversion set according to the magnitude of the dimming gain value DIM_GN and the magnitude of the dimming peak value DIM_PK. The conversion range CR may be set to a high value (e.g., approximately ±163.84 mV) regardless of the magnitude of the dimming peak value DIM_PK when the dimming gain value DIM_GN is high, and the conversion range CR may be set to a low value (e.g., approximately ±40.96 mV) regardless of the magnitude of the dimming peak value DIM_PK when the dimming gain value DIM_GN is low. The conversion time CT may be set to a low or minimum value (e.g., 50 us) when the dimming gain value DIM_GN is high and the dimming peak value DIM_PK is high, the conversion time CT may be set to an intermediate value (e.g., 540 us) when the dimming gain value DIM_GN is high and the dimming peak value DIM_PK is low or when the dimming gain value DIM_GN is low and the dimming peak value DIM_PK is high, and the conversion time CT may be set to a high or maximum value (e.g., 4120 us) when the dimming gain value DIM_GN is low and the dimming peak value DIM_PK is low. The conversion sampling count CSC may be set to a low or minimum value (e.g., 1) when the dimming gain value DIM_GN is high and the dimming peak value DIM_PK is high, the conversion sampling count CSC may be set to an intermediate value (e.g., 64) when the dimming gain value DIM_GN is high and the dimming peak value DIM_PK is low or when the dimming gain value DIM_GN is low and the dimming peak value DIM_PK is high, and the conversion sampling count CSC may be set to a high or maximum value (e.g., 1024) when the dimming gain value DIM_GN is low and the dimming peak value DIM_PK is low.

In the display device 100 according to the present embodiment, the controller 170 may set at least one of the conversion range CR, the conversion time CT, or the conversion sampling count CSC of the analog-to-digital conversion based on the dimming value DIM, and the current oscillation of the panel current PC may decrease when the panel current PC is low, and further the power consumption of the display device 100 due to a rush current may decrease when the panel current PC is high. Herein, the panel current PC may be considered to be high in a case that a rush current is detected.

FIG. 14 is a block diagram showing the current sensing circuit 150 and the controller 170 according to an embodiment.

Referring to FIGS. 1 and 14, the controller 170 according to an embodiment may include a net power control block 171, a conversion setting block 172, a global current management block 173, and an over-current protection block 174.

The net power control block 171 may determine the load LD of the input image data IDAT and the scale factor SF based on the input image data IDAT, a net power control lookup table NPC_LUT, and the dimming value DIM. The reference net power control curve may be stored in the net power control lookup table NPC_LUT. The net power control block 171 may generate the net power control curve based on the reference net power control curve and the dimming value DIM, may determine the load LD of the input image data IDAT based on the input image data IDAT, and may determine the scale factor SF based on the net power control curve and the load LD of the input image data IDAT.

The conversion setting block 172 may set at least one of the conversion range CR, the conversion time CT, or the conversion sampling count CSC based on the dimming value DIM. The conversion setting block 172 may provide at least one of the conversion range CR, the conversion time CT, or the conversion sampling count CSC to the current sensing circuit 150.

The conversion setting block 172 may set the conversion range CR such that the conversion range CR increases as the dimming value DIM increases and the conversion range CR decreases as the dimming value DIM decreases. The conversion setting block 172 may set the conversion time CT such that the conversion time CT decreases as the dimming value DIM increases and the conversion time CT increases as the dimming value DIM decreases. The conversion setting block 172 may set the conversion sampling count CSC such that the conversion sampling count CSC decreases as the dimming value DIM increases and the conversion sampling count CSC increases as the dimming value DIM decreases.

The conversion setting block 172 may include a conversion range setting block 172A, a conversion time setting block 172B, and a conversion sampling count setting block 172C. The conversion range setting block 172A may set the conversion range CR based on the dimming gain value DIM_GN. The conversion time setting block 172B may set the conversion time CT based on the dimming gain value DIM_GN and the dimming peak value DIM_PK. The conversion sampling count setting block 172C may set the conversion sampling count CSC based on the dimming gain value DIM_GN and the dimming peak value DIM_PK.

The global current management block 173 may receive the panel current code PCC from the current sensing circuit 150. The global current management block 173 may receive the load LD from the net power control block 171. The global current management block 173 may determine a target current code corresponding to the load LD. The global current management block 173 may compare the panel current code PCC with the target current code. The global current management block 173 may control the power control signal VC based on the comparison of the panel current code PCC with the target current code. For example, the global current management block 173 may transmit the power control signal VC to the power management circuit 140 to control the power management circuit 140 to supply the panel current PC according to a comparison of the panel current code with the target current code.

The global current management block 173 may transmit the power control signal VC to the power management circuit 140 via Inter-Integrated Circuit ("I2C") communication between the controller integrated circuit 180 and the power management circuit 140.

The over-current protection block 174 may receive the panel current code PCC from the current sensing circuit 150. The over-current protection block 174 may compare the panel current code PCC with a reference over-current code. The reference over-current code may be predetermined. The over-current protection block 174 may control the power management circuit 140 to stop supplying the first power voltage ELVDD when the panel current code PCC is greater than the reference over-current code.

The over-current protection block 174 may receive the power control signal VC from the global current management block 173. The over-current protection block 174 may modify the power control signal VC, which may protect from an over-current condition. For example, the over-current protection block 174 may transmit the power control signal VC to the power management circuit 140 via Inter-Integrated Circuit ("I2C") communication between the controller integrated circuit 180 and the power management circuit 140, and the power control signal VC, modified by the over-current protection block 174 may cause the power management circuit 140 to stop supplying the first power voltage ELVDD to the display panel 110.

In an embodiment, the global current management block 173 may transmit the power control signal VC to the power management circuit 140 via Inter-Integrated Circuit ("I2C") communication between the controller integrated circuit 180 and the power management circuit 140, and the over-current protection block 174 may transmit a separate signal, such as an over-current code, which may stop the power management circuit 140 from supplying the first power voltage ELVDD to the display panel 110.

The current sensing circuit 150 may include a conversion block 151 and a setting register 152.

The conversion block 151 may convert the panel current PC into the panel current code PCC. The conversion block 151 may convert a sensing voltage VSENSE between opposite ends of a sensing resistor RSENSE disposed in the power line PSL into the panel current code PCC. The panel current PC that flows through the sensing resistor RSENSE and the sensing voltage VSENSE between the opposite ends of the sensing resistor RSENSE may be proportional to the panel current PC, and the conversion block 151 may convert the panel current PC into the panel current code PCC using the sensing voltage VSENSE.

The setting register 152 may store at least one of the conversion range CR, the conversion time CT, or the conversion sampling count CSC.

The conversion setting block 172 of the controller 170 may set at least one of the conversion range CR, the conversion time CT, or the conversion sampling count CSC by changing a value of the setting register 152 via the I2C communication between the controller integrated circuit 180 and the current sensing integrated circuit 160.

FIG. 15 is a flowchart showing a method of driving a display device according to an embodiment.

Referring to FIGS. 1 and 15, in a method of driving a display device 100 according to an embodiment, at least one of the conversion range CR, the conversion time CT, or the conversion sampling count CSC of the analog-to-digital conversion for converting the panel current PC into the panel current code PCC may be set based on the dimming value DIM for decreasing the luminance of the image displayed by the display device 100 (S100), the panel current PC may be sensed (S200), and the analog-to-digital conversion for converting the panel current PC into the panel current code PCC may be performed (S300).

In setting at least one of the conversion range CR, the conversion time CT, or the conversion sampling count CSC based on the dimming value DIM (S100), the conversion range CR may be set such that the conversion range CR increases as the dimming value DIM increases and the conversion range CR decreases as the dimming value DIM decreases. The conversion time CT may be set such that the conversion time CT decreases as the dimming value DIM increases and the conversion time CT increases as the dimming value DIM decreases. The conversion sampling count CSC may be set such that the conversion sampling count CSC decreases as the dimming value DIM increases and the conversion sampling count CSC increases as the dimming value DIM decreases.

FIG. 16 is a block diagram showing an electronic apparatus 1100 according to an embodiment.

Referring to FIG. 16, the electronic apparatus 1100 may include a processor 1110, a memory device 1120, a storage device 1130, an input/output ("I/O") device 1140, a power supply 1150, and a display device 1160. The electronic apparatus 1100 may further include a plurality of ports capable of communicating with a video card, a sound card, a memory card, or a USB device, or communicating with other systems.

The processor 1110 may perform specific calculations or tasks. In an embodiment, the processor 1110 may be a microprocessor or a central processing unit (CPU). The processor 1110 may be connected to other components through at least one of an address bus, a control bus, or a data bus. In an embodiment, the processor 1110 may be connected to an expansion bus such as a peripheral component interconnect (PCI) bus. In an embodiment, the processor 1110 may provide the input image data (IDAT of FIG. 1) and the control signal (CTRL of FIG. 1) to the display device 1160.

The memory device 1120 may store data for an operation of the electronic apparatus 1100. For example, the memory device 1120 may include, for example, a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1130 may include a solid state drive (SSD), a hard disk drive (HDD), a CD-ROM, and the like. The I/O device 1140 may include, for example, an input device such as a keyboard, a keypad, a touch pad, a touch screen, or a mouse; and an output device such as a speaker or a printer. The power supply 1150 may supply a power required for the operation of the electronic apparatus 1100. The display device 1160 may be connected to other components through the buses or other communication links. The display device 1160 may correspond to the display device 100 of FIG. 1.

A controller included in the display device 1160 may set at least one of a conversion range, a conversion time, or a conversion sampling count of an analog-to-digital conversion for converting a panel current into a panel current code based on a dimming value, and a current oscillation of the panel current may decrease when the panel current is low, and power consumption of the display device 1160 due to a rush current may decrease when the panel current is high.

A display device according to embodiments may be applied to an electronic display device. For example, the display device according to embodiments may be applied to a computer, a notebook, a mobile phone, a smart phone, a smart pad, a smart watch, a portable media player (PMP), a personal digital assistant (PDA), an MP3 player, or the like.

Although a display device, a controller, and a method of driving the display device according to embodiments have been described with reference to the drawings, embodiments are examples, and may be modified and changed by a person having ordinary knowledge in the relevant technical field without departing from the technical spirit described in the following claims.

What is claimed is:

1. A display device, comprising:

a display panel including a plurality of pixels;

a power management circuit which provides a power voltage to the plurality of pixels through a power line;

a current sensing circuit which senses a panel current flowing through the power line and performs an analog-to-digital conversion for converting the panel current into a panel current code; and a controller which sets at least one of a conversion range of the analog-to-digital conversion, a conversion time of the analog-to-digital conversion, or a conversion sampling count of the analog-to-digital conversion, based on a dimming value that controls a luminance of an image displayed by the display panel such that a manner of performing analog-to-digital conversion on the sensed panel current is influenced by the dimming value, determines a load of input image data and a scale factor based on the input image data, a net power control lookup table, and the dimming value, sets the at least one of the conversion range, the conversion time, or the conversion sampling count based on the dimming value, and provides the at least one of the conversion range, the conversion time, or the conversion sampling count to the current sensing circuit.

2. The display device of claim 1, wherein the controller sets the conversion range such that the conversion range increases as the dimming value increases and the conversion range decreases as the dimming value decreases, sets the conversion time such that the conversion time decreases as the dimming value increases and the conversion time increases as the dimming value decreases, and sets the conversion sampling count such that the conversion sampling count decreases as the dimming value increases and the conversion sampling count increases as the dimming value decreases.

3. The display device of claim 1, wherein the dimming value includes a dimming gain value for decreasing the luminance of the image in a total load section and a dimming peak value for decreasing the luminance of the image in a local load section.

4. The display device of claim 3, wherein the controller sets the conversion range such that the conversion range increases as the dimming gain value increases and the conversion range decreases as the dimming gain value decreases.

5. The display device of claim 3, wherein the controller sets the conversion time such that the conversion time decreases as the dimming gain value increases and the conversion time increases as the dimming gain value decreases.

6. The display device of claim 3, wherein the controller sets the conversion sampling count such that the conversion sampling count decreases as the dimming gain value increases and the conversion sampling count increases as the dimming gain value decreases.

7. The display device of claim 3, wherein the controller sets the conversion time such that the conversion time decreases as the dimming peak value increases and the conversion time increases as the dimming peak value decreases.

8. The display device of claim 3, wherein the controller sets the conversion sampling count such that the conversion sampling count decreases as the dimming peak value increases and the conversion sampling count increases as the dimming peak value decreases.

9. The display device of claim 3, wherein the controller is further configured to:

set the conversion range based on the dimming gain value;

set the conversion time based on the dimming gain value and the dimming peak value; and set the conversion sampling count based on the dimming gain value and the dimming peak value.

10. The display device of claim 3, wherein the controller is further configured to:

receive the panel current code from the current sensing circuit, determine a target current code corresponding to the load of the input image data, and control the power management circuit to supply the panel current according to a comparison of the panel current code with the target current code.

11. The display device of claim 3, wherein the controller is further configured to:

receive the panel current code from the current sensing circuit, compare the panel current code with a reference over-current code, and control the power management circuit to stop supplying the power voltage when the panel current code is greater than the reference over-current code.

12. The display device of claim 1, wherein the current sensing circuit is configured to:

convert the panel current into the panel current code; and store the conversion range, the conversion time, and the conversion sampling count in a setting register.

13. The display device of claim 12, wherein the controller is implemented as a controller integrated circuit, and wherein the current sensing circuit is implemented as a current sensing integrated circuit different from the controller integrated circuit.

14. The display device of claim 13, wherein the controller sets the at least one of the conversion range, the conversion time, or the conversion sampling count by changing a value of the setting register via a bus connecting between the controller integrated circuit and the current sensing integrated circuit.

15. A controller of a display device, comprising configured to:

determine a scale factor based on input image data, a net power control lookup table, and a dimming value for controlling a luminance of an image displayed by the display device; and set at least one of a conversion range of an analog-to-digital conversion, a conversion time of the analog-to-digital conversion, or a conversion sampling count of the analog-to-digital conversion, for converting a panel current into a panel current code, based on the dimming value, and provide the at least one of the conversion range, the conversion time, or the conversion sampling count to a current sensing circuit which senses the panel current.

16. The controller of claim 15, wherein the controller is further configured to set the conversion range such that the conversion range increases as the dimming value increases and the conversion range decreases as the dimming value decreases, set the conversion time such that the conversion time decreases as the dimming value increases and the conversion time increases as the dimming value decreases, and set the conversion sampling count such that the conversion sampling count decreases as the dimming value increases and the conversion sampling count increases as the dimming value decreases.

17. The controller of claim 15, wherein the controller is implemented as a controller integrated circuit, wherein the current sensing circuit is implemented as a current sensing integrated circuit different from the controller integrated circuit, and wherein the controller is further configured to provide the at least one of the conversion range, the conversion time, or the conversion sampling count to the current sensing circuit via a bus connecting between the controller integrated circuit and the current sensing integrated circuit.

18. A method of driving a display device, the method comprising:

controlling a luminance of an image displayed by the display device using a dimming value;

sensing a panel current; and performing an analog-to-digital conversion on the sensed panel current to provide a panel current code, wherein at least one of a conversion range of the analog-to-digital conversion, a conversion time of the analog-to-digital conversion, or a conversion sampling count of the analog-to-digital conversion is set based on the dimming value such that a manner of performing the analog-to-digital conversion on the sensed panel current is influenced by the dimming value, wherein a load of input image data and a scale factor are determined based on the input image data, a net power control lookup table, and the dimming value, and wherein the at least one of the conversion range, the conversion time, or the conversion sampling count is set based on the dimming value, and is provided to a current sensing circuit that is responsible for the sensing of the panel current.

19. The method of claim 18, wherein the setting comprises at least one of setting the conversion range such that the conversion range increases as the dimming value increases and the conversion range decreases as the dimming value decreases, setting the conversion time such that the conversion time decreases as the dimming value increases and the conversion time increases as the dimming value decreases, or setting the conversion sampling count such that the conversion sampling count decreases as the dimming value increases and the conversion sampling count increases as the dimming value decreases.

* * * * *